Patented Sept. 8, 1942

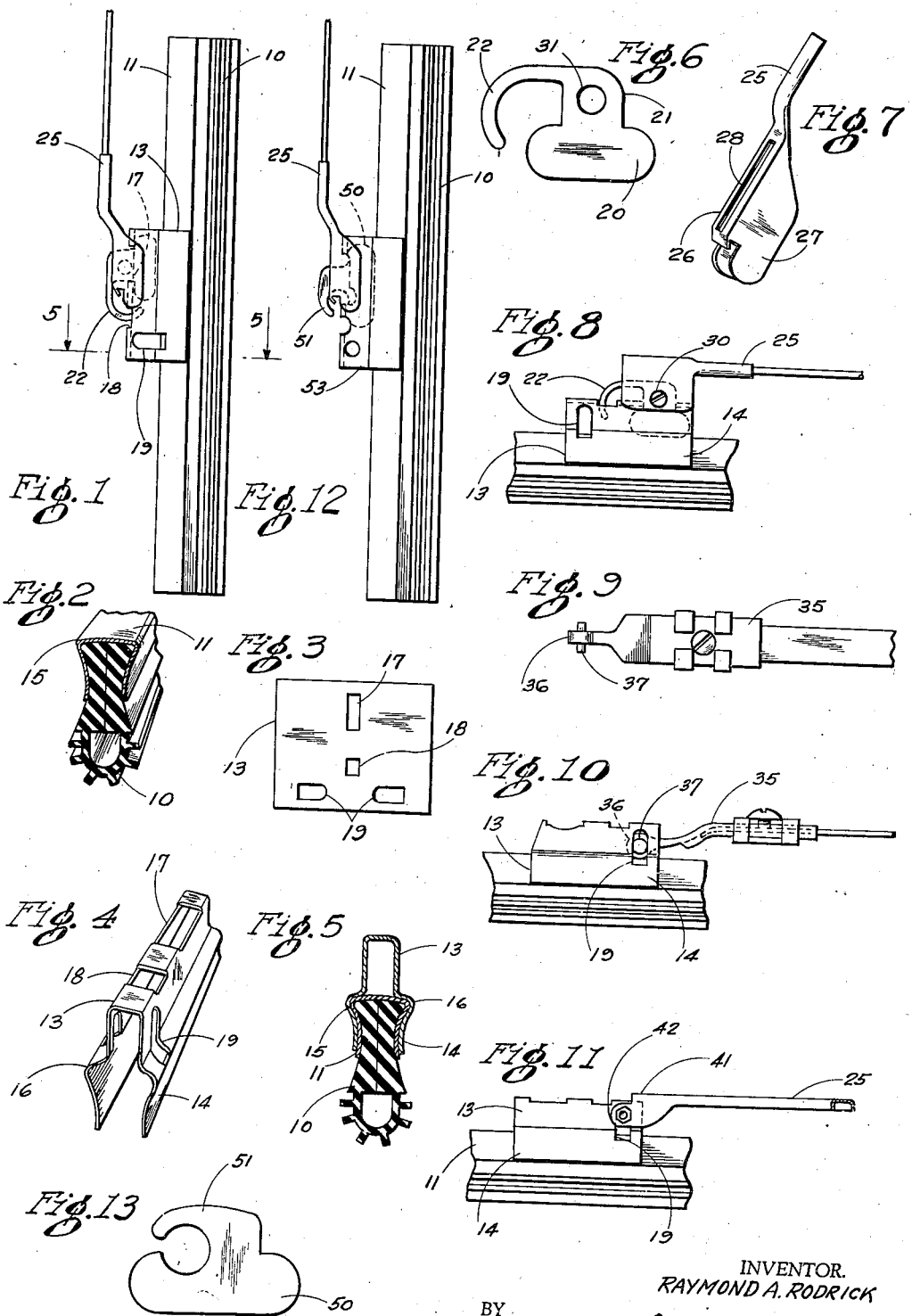

2,295,011

UNITED STATES PATENT OFFICE 2,295,011

WINDSHIELD WIPER

Raymond A. Rodrick, Akron, Ohio

Application July 5, 1940, Serial No. 343,913

9 Claims. (Cl. 15—250)

This invention relates to improvements in windshield wipers and constitutes a continuation in part of my copending application, filed November 9, 1934, Serial No. 752,269.

Heretofore windshield wipers have been formed with a rigid backing member having a clasp securely affixed thereto for attaching the wiper to a wiper arm. In this type of wiper the clasp for connecting the arms to the blade was so fixed that it could not be moved longitudinally of the blade. The failure to provide any adjustment between the arm and blade often resulted in a wiper failing to perform satisfactorily on one type of windshield while operating satisfactorily on another because often the contour and configuration of the windshield on one car would so differ from the windshield on another car that the wiper blade would fail to clean in the proper place or would engage with the side of the windshield limiting or hindering the movement of the blade.

Furthermore, the connection between the wiper arm and the clasp on the wiper blade was such that the wiper arm would often become disconnected from the wiper blade during the operation, resulting in the loss of the blade. Also the connection between the wiper blade and arm was sometimes so loose that the blade would tend to wobble as it was moved across the windshield, thus impairing its cleaning efficiency.

At the present time the manufacturers of automobiles as well as the windshield wiper manufacturer have many different ideas as to how the wiper blade should be secured to the arm. This has resulted in a multitude of various types of connections which sometimes render it difficult to replace worn out blades with new ones having the proper type of attaching medium for securing the blades to the wiper arms.

The present invention contemplates a rigid backing member for the wiper blade with a clasp slidably mounted thereon. The clasp has an attaching clip disposed therein to which the wiper arm is securely connected, thus providing for a positive lock between the arm and wiper. Furthermore, the clasp being slidably mounted on the backing member the wiper blade may be adjusted with respect to the wiper arm to conform to any type of windshield and to vary the radius of the arc in which the blade usually travels.

One of the objects of the present invention is to provide a windshield wiper having a rigid backing member with a wiper arm secured thereto by a clasp which telescopically engages the backing member for adjustably positioning the wiper with respect to the wiper arm.

Another object of the invention is to provide in a windshield wiper a rigid backing member having a clasp slidably mounted thereon with a hooked end attaching clip projecting therefrom for securely locking the wiper arm thereto.

Another object of the invention is to provide a rigid channel shaped backing member having a clasp of complemental configuration slidably mounted thereon and frictionally engageable therewith for securely interlocking the wiper arm attaching clip therebetween.

Another object of the invention is to provide in a windshield wiper a rigid channel shaped backing member and a clasp of complemental configuration having a plurality of aligned apertures therein for the reception of a wiper arm, said clasp being slidably mounted on the backing member for securely locking the wiper arm within the clasp.

Another object of the invention is to provide a universal attaching clasp for a windshield wiper blade which is adaptable to secure the wiper blade to the many various designs of the wiper arms now in use.

Another object of the invention is to provide a windshield wiper that is economical of manufacture, rigid of structure and securely connected to the wiper arm.

Other object and advantages more or less ancillary to the foregoing and the manner in which all the various objects are realized will appear in the following description, which considered in connection with the accompanying drawing, set forth the preferred embodiment of the invention.

Referring to the drawing:

Fig. 1 is a side elevational view of a windshield wiper showing the clasp mounted on the wiper blade with the wiper arm attached thereto;

Fig. 2 is a perspective view showing a rigid backing member with a flexible wiper secured between the sides thereof, the end of the wiper and backing member being shown in section;

Fig. 3 is a plan view of the blank used in forming the improved clasp of my invention;

Fig. 4 is a perspective view of the clasp formed from the blank of Fig. 3;

Fig. 5 is a transverse sectional view of the windshield wiper and the clasp, the section being taken on the line 5—5 of Fig. 1;

Fig. 6 is a side elevational view of the interlocking attaching hook employed in connecting certain types of wiper arms to the clasp;

Fig. 7 is a perspective view showing an end portion of one type of wiper arm;

Fig. 8 is a side elevational view of a modified type of wiper arm secured to the clasp by the interlocking hook;

Fig. 9 is a plan view showing an end portion of another type of wiper arm;

Fig. 10 is a side elevational view showing the wiper arm disclosed in Fig. 9 secured to the clasp;

Fig. 11 is a side elevational view of another modified type of wiper arm secured to the clasp;

Fig. 12 is a side elevational view of a windshield wiper showing a modified form of an attaching clip; and Fig. 13 is a side elevational view of the modified attaching clip used in Fig. 12.

Referring to Fig. 1, there is shown a windshield wiper comprising a flexible wiper strip 10 having its lateral edges thereof secured within a backing member 11.

The backing member 11 is die stamped from a strip of metal into channel configuration with the side walls thereof inclined inwardly and having a slight outward flare at the mouth of the channel. The inclined side walls are adapted to clasp the lateral edges of the flexible strip 10 for securely retaining the same within the channel shaped backing member.

A clasp or saddle 13 is provided and is formed from a channel piece with the lower portion 14 thereof being of complemental configuration to the rigid backing member 11. The opposed longitudinal ribs 15 and convergent side walls of the rigid backing member 11 are engaged by the complementary ribs 16 and side walls of the lower portion 14 of the clasp 13. The lower portion 14 of the clasp frictionally engages the backing member for adjustably positioning the clasp thereon, and although gripping it with sufficient pressure to hold it against displacement permits the parts to be slid relative to each other. Formed in the narrow base or upper side of the channel shaped clasp there are slots 17 and 18. Laterally aligned apertures 19 are provided in the side walls of the clasp adjacent one end thereof. The apertures 19 extend from the upper portion of bight of the narrow base of the clasp downwardly through the longitudinal ribs 16 and into the side walls of the lower portion 14, which engage the rigid backing member 11 of the wiper blade.

Loosely disposed within the narrow base of the channel shaped clasp 13 there is an attaching clip or hook provided with a base 20 having a portion 21 extending upwardly therefrom and projecting through the slot 17 in the bight of the clasp. A hooked end 22 is formed integrally with the portion 21 and extends longitudinally therefrom and thence downward into the other slot 18 in the bight of the clasp as is best shown in Fig. 1. The base 20 of the clip is of sufficient size to prevent the clip from passing through the opening 17 and is secured within the clasp 13 by first inserting the clip through the opening 17 in the clasp after which the clasp is slid onto the rigid backing member 11. The engagement of the clasp with the rigid backing member 11 securely locks the attaching clip within the clasp so that it can be removed therefrom only upon the disengagement of the clasp from the backing member.

A wiper arm 25, Fig. 7, is provided and includes a back portion 26 having a pair of parallel side walls 27 extending downwardly therefrom, which are adapted to straddle the upper portion and bight of the clasp 13. An elongated opening 28 formed within the back portion 26 is adapted to have the attaching clip inserted therethrough prior to its projection into the slot 18. In securing the wiper arm to the wiper, the clasp 13 and attaching clip are removed from the rigid backing member, which movement enables the attaching clip to be tilted within the clasp so that the hooked end 22 of the clip may be inserted through the opening 28 within the wiper arm. With the wiper arm connected thereto the clip is moved into its aligned position within the clasp so that the hooked end 22 extends over the end of the back portion 26 of the wiper arm and into the slot 18. The clasp is then slid onto the backing member 11, which movement securely locks the attaching clip and wiper arm to said clasp. In securing the wiper arm to the hooked end 22 of the attaching clip the side walls 27 engage the narrow base of the channel shaped clasp to provide a fairly rigid connection between the wiper arm and the wiper.

As shown in Fig. 8, the attaching clip has secured thereto a modified form of the wiper arm, which has an enlarged end portion thereon formed with parallel sides which have aligned openings therein. With the clasp 13 and attaching clip disposed upon the rigid backing member 11 a screw 30 is inserted through the aligned openings in the enlarged portion of the wiper arm, one of which is threaded, and through an opening 31 formed in the portion 21 of the attaching clip. The parallel sides of the end portion subjacent the aligned openings are adapted to fit over the narrow channel shaped portion of the clasp 13 to prevent the wiper arm from having any movement in the direction of the screw 30.

Still another modification of the wiper arm is illustrated in Figs. 9 and 10. The wiper arm, which in this instance may be a flat strip of rectangular cross section, has secured thereto a connector 35. The connector may be formed integral with the end of the wiper arm or it may be attached thereto, as shown in Fig. 10. In either event the connector has an enlarged rounded end portion 36 provided with a cross pin 37, which extends laterally from the sides of the end portion.

In attaching the connector of Figs. 9 and 10, the clasp 13 is partially disengaged from the rigid backing member 11 to allow the end portion of the clasp having the apertures 19 therein to extend beyond the end of the wiper blade. The connector is then inserted into the clasp between the side walls of the lower portion 14 which walls have sufficient clearance therebetween to allow the cross pin 37 to move upward into the lower portion of the apertures 19. The pin 37 on the end of the connector is then moved to the top portion of the apertures 19, whereupon the clasp 13 is then moved back upon the backing member 11. The enlarged rounded end portion 36 of the connector is adapted to bear on the backing member 11, while the pin 37 extends laterally through the apertures 19, thus securely locking the wiper arm within the clasp and enabling it to be removed therefrom, only when the clasp is disengaged from the backing member 11.

Another modified form of the wiper arm is disclosed in Fig. 11 wherein there is a saddle 41 formed on the end of the wiper arm and provided with downwardly extending parallel side members. The parallel side members are provided with forwardly projecting lips or portions 42 which have axially aligned openings formed therein. The openings in the lips 42 are adapted to be moved into alignment with the apertures 19 formed in the clasp 13 for the reception of a pin or bolt which is passed through said openings for securing the wiper arm to the clasp. The lips 42 are disposed in parallel relation with the narrow channel base portion of the clasp 13 for imparting a rigid connection between the clasp and wiper arm.

The modified form of the windshield wiper disclosed in Fig. 12 is similar to that as shown in Fig. 1, with the exception of the attaching clip 50. The attaching clip 50, Fig. 13, differs from clip 20 in that the end portion 51 is shorter than the hooked end portion 22 of the clip 20. The wiper arm 25, Fig. 7, may be secured to the attaching clip 50 by simply inserting the end 51 of the clip through the opening 28 formed therein. With this type of clip the wiper arm is not securely locked to the clasp 53 by its telescopic engagement with the rigid backing member 11. However, the clasp 53 is slidably mounted on the backing member of the wiper for adjustably positioning the wiper with respect to the wiper arm, and the arm cannot be removed without rotating the blade clockwise, as viewed in Fig. 12.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a windshield wiper embodying a rigid backing member formed with opposed longitudinal ribs, a flexible wiper mounted in said member, a clasp slidably mounted on said member, said clasp formed with a plurality of slots therein, an attaching clip disposed in the clasp with a portion thereof projecting through one of the slots, a hook formed on the projecting portion and extending into a second slot in said clasp, said hook providing means for securing the clasp and wiper to a wiper arm.

2. In a device for securing a windshield wiper blade to a windshield wiper arm, a U-shaped clip having a web and opposed side walls, said side walls adapted to embrace the back of a windshield wiper blade, the web portion of said clip and the side walls thereof immediately adjacent the web cut away to provide an opening and a notch in the back of the clip and a removable wiper arm retaining fin arranged in the space between the side walls of the clip, said fin being secured to the clip and said fin having a portion projecting through said opening and an anchoring bar part having such dimensions as to prevent said bar passing through the opening, said fin provided with a notch cooperating with said first named notch to effect securement of a wiper arm to the clip.

3. A universal mounting for a windshield wiper blade comprising a U-shaped clip adapted to embrace the back of a windshield wiper blade, the web portion of said clip cut away intermediate the ends thereof to provide an opening through the back of the clip, a removable wiper arm retaining fin arranged in said clip having an arm retaining portion projecting through the opening in the clip and beyond the back of the clip, an overhanging part on said projecting portion, a notch formed in said clip opposite said overhanging part and an enlarged anchoring base portion in said fin disposed between the side walls of the clip.

4. In a windshield wiper embodying a wiping element, a clasp engageable therewith and slidably mounted thereon, said clasp having aligned openings in opposed sides thereof, a wiper arm having a pin extending through an end thereof normal thereto, said clasp being adapted for removal from said wiping element to permit the attachment of the wiper arm therein with the in projecting through said openings, said wiper arm irremovably secured to the clasp when said clasp and wiper arm are moved upon the wiping element.

5. In a windshield wiper embodying a rigid channel shaped backing member having a flat base portion terminating in convergent side walls, a flexible wiper mounted therein, an inherently resilient clasp in the form of a channel member having the sides thereof forming spring jaws to receive and frictionally hold said convergent side walls and also engage a portion of the flat base of said backing member, said clasp movable longitudinally upon said backing member to any desired position and adapted to be held in said position by the resiliency of said jaws, a wiper arm and means disposed within the clasp and engaging said backing member to lock said wiper arm to the wiper.

6. In a windshield wiper embodying a rigid channel shaped backing member having a flat base portion terminating in convergent side walls, a flexible wiper mounted therein, a clasp in the form of a channel member having the sides thereof forming spring jaws to receive and frictionally hold said convergent side walls and also engage a portion of the flat base of said backing member, a wiper arm, means within said clasp to facilitate connection of said wiper arm and wiper, said clasp slidably engageable with said backing member and adapted when in a partially removed position from said backing member to receive said means and adapted when engaged with said backing member to permit the securement of said means to said wiper arm, said means and clasp having at least limited freedom of relative movement and being inseparably connected so long as said clasp is at least fully engaged with said backing member.

7. In a windshield wiper embodying a rigid backing member having a flat base portion terminating in concaved sides, a flexible wiper mounted between the sides, an inherently resilient clasp slidably mounted on said backing member and being of channel configuration with the sides thereof forming spring jaws to receive and frictionally hold said concaved sides and also a portion of the flat base of said backing member, said clasp having an opening therein, an attaching clip disposed within said clasp and having a hooked end thereon projecting through the opening in the clasp, a wiper arm detachably mounted on the hooked end, said clip and wiper arm being secured together upon the slidable engagement of the clasp with the backing member.

8. In a windshield wiper embodying a rigid backing member having a flat base portion terminating in convergent side walls, a flexible wiper mounted therein, an inherently resilient channel shaped clasp having a narrow base portion terminating in enlarged side portions of a configuration complemental to the backing member, said clasp slidably mounted on the backing member with the side portions receiving and frictionally holding the convergent side walls and a portion of the flat base of said backing member, a clip disposed within the clasp and locked therein upon the slidable engagement of the clasp with the backing member, said clasp having an opening in the base portion, a portion of said clip extending through the opening in said clasp, said portion of the clip having an opening therein, a pin projecting through the opening in the clip for securing the clasp to a wiper arm.

9. In a windshield wiper embodying a rigid backing member having a flat base portion terminating in concaved sides, a flexible wiper mounted between the sides, a clasp of channel configuration having a portion of the sides forming spring jaws to receive and frictionally hold the concaved sides and also a portion of the flat base of said backing member, said clasp having aligned openings disposed in a portion of the sides superjacent the spring jaws, a wiper arm, a pin extending through an end portion of the arm normal thereto, said pin and end portion of the wiper arm adapted to be disposed in the clasp with the pin projecting through the openings, said clasp being adapted to slidably engage the backing member for securing the wiper arm to the wiper.

RAYMOND A. RODRICK.